W. G. Hagaman.
Forming Bats.

No. 16,543.  Patented Feb. 3, 1857.

SIGNED W. G. Hagaman

WITNESSES John Apple
Thomas R. McLaughlin

UNITED STATES PATENT OFFICE.

WASHINGTON G. HAGAMAN, OF PHILADELPHIA, PENNSYLVANIA.

MACHINE FOR FORMING FELT-HAT BATS.

Specification of Letters Patent No. 16,543, dated February 3, 1857.

*To all whom it may concern:*

Be it known that I, WASHINGTON G. HAGAMAN, of Philadelphia, in the county of Philadelphia, State of Pennsylvania, have invented a new and useful Improvement in Hat-Felt Machines; and I do declare that the following is a full, clear, and exact description of the same, reference being had to the accompanying drawing and to the letters of reference marked thereon.

The nature of my invention consists in combining a flat rotary sieve on which the bat is formed, with an adjustable deflector, over which the fur is precipitated upon said sieve; the operation of the combination being to effect the formation of flat circular bats of suitable thickness at the several distances from the center; the advantages of which are hereinafter set forth.

Figure 1:
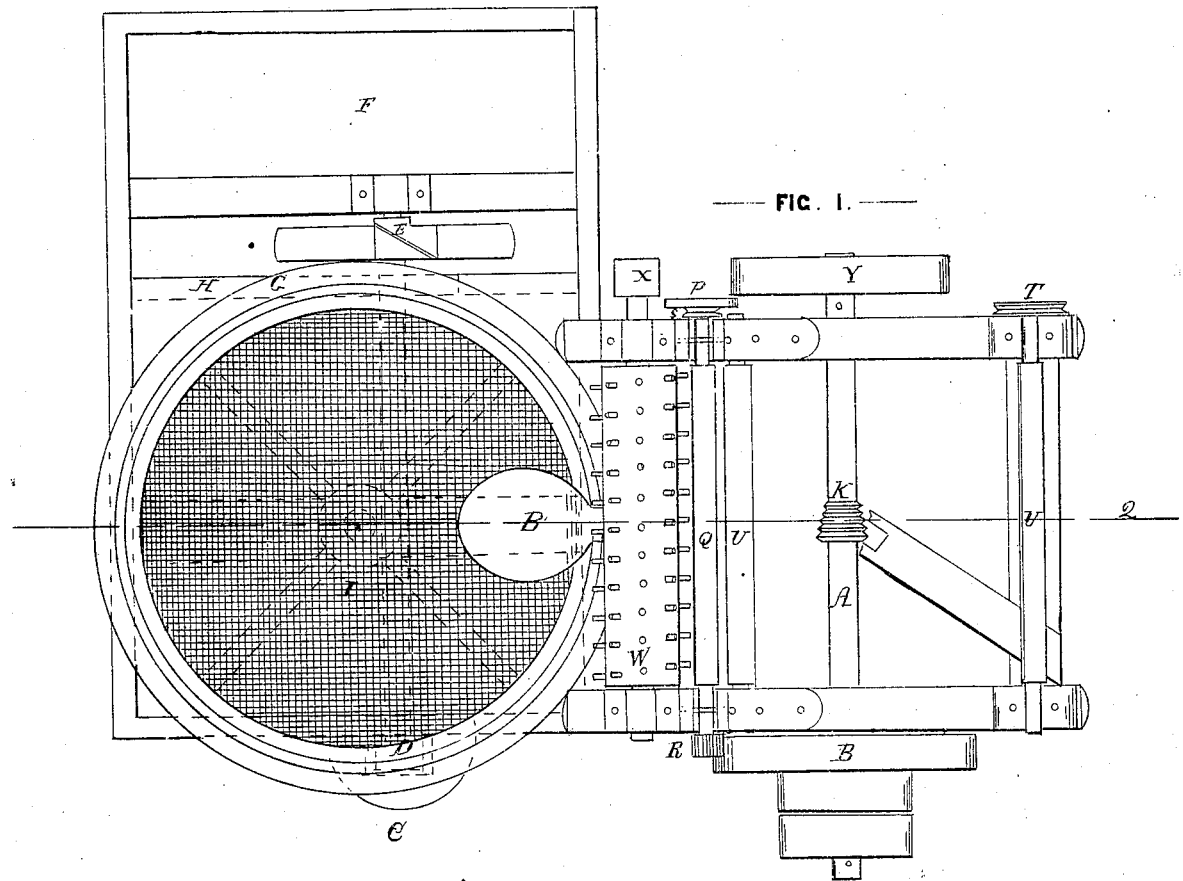
Figure 2:
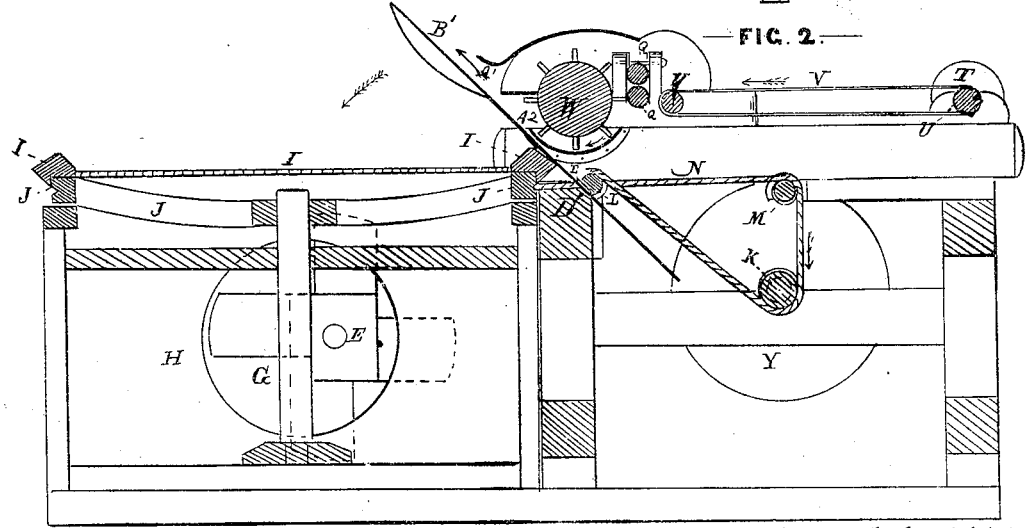

On reference to the drawing which forms part of this specification, Figure 1 is a plan of a flat felt machine, with my improvements attached. Fig. 2, is a sectional elevation on the line 1, 2, (Fig. 1.)

Similar letters refer to like parts throughout both views.

A is the main shaft. The pulley B by means of a belt and pulley D, gives motion to the shaft C. Near the opposite end of the shaft C, to that on which the pulley D is located, a fan wheel E is secured. The apartment F, in which the fan wheel is situated, is closed at its top by a door, or trap. The bottom is left open, by means of which; together with the circular opening G, formed in the partition H, the fan wheel E exhausts the air from the chamber over which the sieve I is placed, the opening in the top of which chamber is equal to the diameter of the sieve I, the rim of which rests on a corresponding portion of the horizontal wheel J, and revolves with it. The wheel J receives its motion from the cone pulley K, sheaves L, M, and band N. From the shaft A at the point O, a belt connects with the pulley P, giving motion to the feed rollers Q, Q, which are connected at their opposite ends from the pulley P, by pinions R. From the pulley S, a band connects with the pulley T, thereby giving motion to rollers U, U, and also to the feed cloth V, the width of which is equal to the length of the rollers from which it derives motion. The picker W is driven by means of a belt, and the pulleys X, Y.

The material from which felts are to be made, is placed on the feed cloth V, by which it is carried to the feed rollers Q, Q, and after passing through the feed rollers comes in contact with the picker W, by the velocity of which it is blown through the aperture formed by the top, and bottom casings $A^1$ and $A^2$ of the picker W, and is attracted to the upper surface of the sieve I, by the partial vacuum formed beneath the surface of the sieve, by the motion of the fan wheel E. Between the aperture, through which the material escapes from the picker, and sieve I, a flexible deflector $B^1$ is placed, the upper portion of which is of a circular form; the sides being depressed in order to render its upper surface convex, for the purpose of preventing the material from remaining thereon. From the flexibility of the deflector, the resisting surface which it presents to the attraction of the material to the center of the sieve, may be increased, or diminished, by expanding, or contracting its sides. The lower portion of the deflector, passes through a guide formed between the cross timber $D^1$ and strap $E^1$ which strap clamps the lower extension of the deflector sufficiently tight to cause it to remain in any position in which it may be placed. The angle of the deflector can be changed, by bending that portion of it which passes through the guide.

The object of the deflector $B^1$, is to cause a gradual diminution in the thickness of the felt, between its edge and center. The advantage of the flat circular sieve, over a perforated cone, in the manufacture of hat felts is, that by the use of a flat circular sieve, to remove the felt, or fabric formed thereon, it is only necessary to invert the sieve. The process of hardening the felt, in the position; and on the means, on which it is formed; being obviated,—the process of hardening the felts, formed on the flat circular sieve, or sieves, after their removal from the sieve, or sieves, without being hardened; is at the option of the operative, or manufacturer,—another advantage which the flat circular sieve has over the cone is; that the force with which the fur, or other fibrous material is drawn against the upper surface of the sieve, is uniform; thereby causing a uniform compactness of the felt, or fabric formed thereon, which is not the case in felts formed over perforated cones, as there is a difference in the force of the vacuum; due to the height of the cone. The advantage of flat circular felts over those of a conical form in the manufacture of what are called soft hats, is; that their crowns incline to the original form of the felts from which they are made, which is an objection to the conical formed felts.

I do not claim the removal of the bat from the surface on which it is formed, before hardening, such having been done by A. Rankin as shown in his patent of October 3d 1854. Nor do I claim the mere employment of a flat surface on which to form the bat. But What I do claim as new and of my own invention and desire to secure by Letters Patent, is—

The combination of the flat rotary sieve I with the deflector $B^1$, arranged and operating substantially as and for the purposes hereinbefore set forth.

W. G. HAGAMAN.

Witnesses:
   JOHN APPLE,
   THOMAS G. McLAUGHLIN.